United States Patent
Viturro et al.

(10) Patent No.: US 7,069,164 B2
(45) Date of Patent: Jun. 27, 2006

(54) METHOD FOR CALIBRATING A MARKING SYSTEM TO MAINTAIN COLOR OUTPUT CONSISTENCY ACROSS MULTIPLE PRINTERS

(75) Inventors: R. Enrique Viturro, Rochester, NY (US); Lalit K. Mestha, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 222 days.

(21) Appl. No.: 10/673,688

(22) Filed: Sep. 29, 2003

(65) Prior Publication Data

US 2005/0071104 A1 Mar. 31, 2005

(51) Int. Cl.
*G01M 19/00* (2006.01)
*G06F 3/00* (2006.01)
*G01N 21/25* (2006.01)

(52) U.S. Cl. .......................... 702/85; 356/419; 358/1.9; 702/196

(58) Field of Classification Search .................. 702/27, 702/49, 66, 67, 75, 76, 85, 115, 118, 120, 702/126, 134, 135, 171, 184, 189, 196; 356/326, 356/328, 402, 419; 358/1.9, 406, 504; 347/131, 347/240, 251, 254
See application file for complete search history.

(56) References Cited

U.S. PATENT DOCUMENTS

| | | | | |
|---|---|---|---|---|
| 6,081,348 A | * | 6/2000 | Budnik et al. ............... 358/406 |
| 6,351,308 B1 | * | 2/2002 | Mestha ........................ 356/402 |
| 6,556,300 B1 | * | 4/2003 | Tandon et al. ............... 356/419 |
| 6,584,435 B1 | | 6/2003 | Mestha et al. ............... 702/196 |
| 6,587,793 B1 | * | 7/2003 | Viassolo et al. .............. 702/27 |
| 6,721,692 B1 | * | 4/2004 | Mestha et al. ............... 702/196 |
| 2003/0055611 A1 | | 3/2003 | Mestha et al. |
| 2003/0112455 A1 | * | 6/2003 | Ueda et al. .................. 358/1.9 |

OTHER PUBLICATIONS

Pending U.S. Appl. No. 09/566,291, filed May 5, 2000, entitled "On–Line Calibration System for a Dynamically Varying Color Marking Device", by Lalit K. Mestha et al.

* cited by examiner

*Primary Examiner*—Michael Nghiem
*Assistant Examiner*—John Le (57) ABSTRACT

What is disclosed is a method for maintaining consistent color output across printers even when the inline sensors have differences in accuracy due to various technical and environmental factors. A spectrophotometer is used to measure the color quality of printed references. Adjustments are then iteratively made until reference charts of desired color quality are obtained. The printed reference allows one to achieve relatively high system performance by removing sensor inaccuracies. Using the printed reference measured by the inline sensor control systems of each machine are calibrated. At customer sites and at suitable intervals, a reference document can be read using the inline sensor on a reference machine and any differences from expected values can be calibrated out. The present method is also applicable to other color management functions such as memory color and automatic profile generations using inline/offline sensors and can be used for determining reference values while calibrating control systems of printers over a wide range of applications.

19 Claims, 10 Drawing Sheets

METHOD FOR CALIBRATING A MARKING SYSTEM TO MAINTAIN COLOR OUTPUT CONSISTENCY ACROSS MULTIPLE PRINTERS

INCORPORATION BY REFERENCE

The following U.S. patent applications are hereby incorporated herein:

U.S. application Ser. No. 09/566,291, filed May 5, 2000, entitled: "On-Line Calibration System For A Dynamically Varying Color Marking Device", by Lalit K. Mestha et al.;

U.S. application Ser. No. 09/941,774, filed Aug. 30, 2001, entitled: "Systems And Methods For Determining Spectra Using Dynamic Karhunen-Loeve Algorithms With Measurements From Led Color Sensor", by Lalit K. Mestha et al.; and U.S. application Ser. No. 09/941,858, filed Aug. 30, 2001, entitled: "Systems And Methods For Determining Spectra Using Dynamic Least Squares Algorithms With Measurements From Led Color Sensor", by Lalit K. Mestha et al.

FIELD OF THE INVENTION

The present invention relates to those methods found in the arts, which account for sensor to sensor variations among different printing machines.

BACKGROUND OF THE INVENTION

In conventional marking devices, quality defects appear in a marked image due to various factors. For example, changes in the optical density introduced by differences in laser/LED bar intensities, subsystem non-uniformities, donor roll reload, and the like can lead to image quality defects. Additionally, spatial non-uniformity errors, e.g., a situation in which pixels in one part of an image that have been defined as a certain color appear different from pixels in another part of the image that have been defined as the same color, are also present. Wire history, wire contamination, charging subsystem variations and photoreceptor variations are among the root causes for spatial non-uniformity errors in images.

Spatial non-uniformity errors can be addressed by modifying hardware or hardware operations. For example, in LED bars, exposure variations can-be minimized by measuring the output of the LED elements and adjusting their duty cycle and/or intensity to ensure that all the elements have the same output. In laser exposure systems, similar duty cycle adjustments can be performed to minimize the exposure-related non-uniformities. Furthermore, routine cleaning of wires to remove contamination helps to reduce wire history-related non-uniformities.

Modifying hardware or hardware operations results in added downtime, which often translates into lost revenues. Moreover, since image quality defects of various types often occur together (e.g., banding, streaking, mottle, macro and micro non-uniformity, etc.), it is often the case that by optimizing the system to address one type of defect usually results in amplifying one or more of the other types of defects. In addition to image quality defects often colors are not consistent. A solution to this problem has already been disclosed in U.S. application Ser. No. 09/566,291 entitled: On-Line Calibration System For A Dynamically Varying Color Marking Device. Therein, a color marking device including a control system for calibration of the device based upon dynamic color balance control of an output image is disclosed comprising a front end converter for converting an input signal representative of a target image having a pre-selected color into a device-dependent control signal in accordance with a device TRC, a color marking device for outputting an output image in response to the control signal, a sensor for measuring a parameter from the output image representative of a color of the output image, and, a point-wise controller for comparing the parameter with a corresponding parameter from the target image and constructing adjusted controlled points for the device TRC when the measured parameter and the corresponding parameter vary by a pre-selected value, a color balance controller for constructing an adjusted device TRC from the controlled points, whereby subsequently generated output images are output with the adjusted device TRC and, more accurately represent target input images.

However, additional problems have arisen. In principle, printing equal amounts of cyan, magenta and yellow should produce a specific neutral gray. Instead, printers generally make a chromatic gray (a*,b*≠0) rather than a neutral gray. The printer will not produce a specific neutral gray due to limitations on the color pigments of the primaries and on the processes of the print engine. To overcome this last effect, gray balanced TRCs are used as LUTs to modulate the proportions of cyan, magenta and yellow depending on the state of the materials and of the print engine. For gray balancing printers, spectrophotometers are often used as sensors because gray is a mix of cyan, magenta and yellow primaries. Sensor to sensor differences are likely to result in differences in quality among prints across a plurality of differing print machines. Thus, what is also needed in this art is a method to account for sensor to sensor differences due to errors in spectral reconstruction algorithms such that sensor-to-sensor variations among different machines can be eliminated and overall machine-to-machine variations (i.e., sensor mounting variations, etc.) are reduced.

BRIEF SUMMARY OF THE INVENTION

What is disclosed is a method for maintaining consistent color output across printers even when the inline sensors have differences in accuracy due to various technical and environmental factors. A spectrophotometer is used to measure the color quality of printed references. Adjustments are then iteratively made until reference charts of desired color quality are obtained. The printed reference allows one to achieve relatively high system performance by removing sensor inaccuracies. Using the printed reference measured by the inline sensor control systems of each machine are calibrated. At customer sites and at suitable intervals, a reference document can be read using the inline sensor on a reference machine and any differences from expected values can be calibrated out. The present method is also applicable to other color management functions such as memory color and automatic profile generations using inline/offline sensors and can be used for determining reference values while calibrating control systems of printers over a wide range of applications.

BRIEF DESCRIPTION OF THE DRAWINGS

Exemplary embodiments of the invention will be described with reference to the drawings, wherein like numerals represent like parts, and wherein.

DESCRIPTION OF THE SPECIFICATION

Co-pending U.S. application Ser. No. 09/566,291 filed May 5, 2000 by Lingappa K. Mestha, et. al., entitled: "On-Line Calibration System For A Dynamically Varying Color Marking Device," discloses a method and apparatus for automatically calibrating a digital printing system utilizing a limited dynamic color balance control system using an on-line spectrophotometer color measurement system in the output path of a color printer for measuring colors on printed test sheets/banner pages without requiring any manual operations or operator involvement. The automatic color balance control system produces tone values for all four of the primary colors by printing patches, measuring colors and automatically readjusting the tone reproduction curves until a satisfactory level of accuracy is obtained. While producing color balanced TRCs, the system will automatically lock the printer output to some predetermined color patch targets. In one particular preferred embodiment, this output is locked to neutral gray when target colors are set to neutral gray inside the digital front end (DFE). After converging to the targets, the control system will return full TRCs for use inside the normal print path. The process is enabled either by the system controller or by the user with minimal intrusion. The control system uses innovative control algorithms to achieve greater accuracy in the presence of uncertainties in the printing system. The printer comprises a marking device and a spectrophotometer providing spectral information comprising a representative signal of the printed colors of the image and preferably comprises L*, a*, b* values, XYZ, Luv, etc., values depending on the desired color description. For this description, only L*, a*, b* coordinate space values are used for describing color. The digital front end (DFE) comprises a conventional image color separation path for processing an input image as specified in device independent parameters into CMYK printing parameters acceptable by the printer. A 3D LUT transforms the original image in device independent space to CMY space. The CMY space is transformed to CMYK space by under-color removal/gray component replacement. Linearization of the Tone Reproduction Curve (TRC) comprises a calibration and characterization process. The particular linearized signal resulting from the TRC is converted into a halftone imaging before actual printing by the marking device.

In most cases, re-RIPping (Raster Input Processing) of the images is not required when the color balance can be achieved by adjusting TRCs generated by printing mixed color patches of specified target patches that are neutral, instead of printing patches with primary colors—CMYK. The RIP'ed image can then be processed with color balanced TRCs easily inside the DFE for facilitating the use of reprinting RIP'ed jobs without going through a costly and time consuming re-RIP'ing process.

The detailed construction of the TRCs is primarily effected in two steps: (1) the K-TRC and then (2) the CMY-TRCs. A test pattern is used for building the K-TRC and comprises a plurality of fiducial marks which are read by a fiducial mark sensor to create trigger signals for the test patches for the measuring of output images generated by the printing device in response to the input test pattern. The printing of the patches is intended in the subject example, to be in varying degrees of gray, i.e., $a*=b*=0$, and K between 0 to 100%. Other colors could also be used such as the colors near neutral gray with chroma greater than zero. A varying number of patches or test pages can, of course, be used. The color L*, a*, b* values of the output patches are measured by sensor using the input K values of the input test target data. The measured L* values (a* and b* values are discarded from this measurement since inaccuracies caused by dropping a* and b* values are taken care of by the CMY-TRCs). A smooth one-dimensional input K to L* function is constructed. Construction of the K-TRC is accomplished for calibrating the output K neutral grays to the desired target input neutral grays by inverting the determined function around the linear 45 degree line between input K and output L*. Such inversion is required to linearize the printing system for producing reasonably good black. The exact shape of the K-TRC, especially near the endpoints, can be altered to suit any particular need using any of several data smoothing and normalization algorithms known in the arts.

CMY-TRCs from similar test target patterns are obtained except that the test patterns comprise patches having $K=0$ and a pre-selected number of mixed color patches with appropriate CMY values. The desired CMY values are determined iteratively by using the subject color to track the target patches. The particular problem in the CMY-TRC construction process is that the measured L*, a*, b* comprise a measurement of three parameters (not just the one as in K-TRC construction). However, conceptually for a neutral gray, $a*=b*=0$, so one can simplify a curve correction from a three parameter three-dimensional lookup table to a set of three one-dimensional adjustment curves. In other words, and for example, for a neutral gray output having the input L* value 50, one can normally assume that $C=M=Y=50$ (on a scale related to, but not equal to, L*,) and the measured value should be $L*=50$ and $a*=b*=0$.

When an actual output has a* and b* values for a target neutral gray, color values need to be adjusted to generate the appropriate neutral gray output which, in this example, $L*=50$. In this case the C, M and Y could be adjusted to values other than 50 to accommodate the particular printing operation of the subject printing device so that the eventual output would achieve some CMY mix which would have a neutral gray output of $L*=50$ for the particular printer. The comparison of the target test patches with the measured values of the printer output from sensor are compared and the difference transformed with a multi-input, multi-output controller for outputting a transformed error vector. The input representing the target colors (again, in this particular example, L* values are between 0 to 100 and a* and b* values are equal to zero) is also fed to a look-up table. This look-up table could be an approximate inverse of the printer (i.e., L*, a*, b*→CMY) or simply $L*=C=M=Y$.

Using the output of the look-up table, first prints of the patches are made. The input target values are then compared to the measured colors to obtain the error. The output of the first summing node is an error signal representing the difference between the desired target color and the output color, which is processed through an integrator, which integrates the weighted errors and outputs corrections to the value that is the output from the look-up table.

Assuming k is the iteration index, the equations for each controlled point [single color] become; $V_i(k)=V_i(k-1)+U_i(k)$; $U_i(k)=K_iE_i(k)$, where $E_i(k)=[L^{*t}_i-L^{*m}_i \ a^{*t}_i-a^{*m}_i \ b^{*t}_i-b^{*m}_i]^T$ and $K_i$ is an $i^{th}$ matrix of dimensions 3×3. $L^*_i$, $a^*_i$, $b_i^*$ ... are color values of $i^{th}$ number of patches with i equals color patch numbers between 1 to N. $V_i(k)$ is a function giving rise to delta for C, M, Y values wherein t indicates target values, m indicates measured values and T indicates matrix transpose. The matrix $K_i$ is predetermined from a first set of input-output characterization of the printer for each control point and is stored in memory in the controller. The L*, a*, b*→CMY values are used to build smooth 1D TRC functions. Since the controller does not normally work very well at the gamut boundaries, it will be desirable to include new ways to shape the TRCs at the boundaries of the TRCs. The desired final shape or response of CMY-TRCs causes the color image to print correctly by making these approximately linear in L* with appropriate smoothing near the boundaries for adjusting highlight and shadow colors.

The iterative process of adjusting CMY values to converge from the corresponding measured output L*, a*, b* values to target colors generates a set of controlled points for a CMY-TRC which accurately represent device operation. The CMY-TRCs are then constructed from the controlled points by the mapping of target colors (L*, a*, b* to CMY), in particular when neutral gray colors are used as target colors, mapping of input L* to CMY values from the acceptable iterations for accurate and desired points on the TRC curves. Iterations occur until the detected differences between the target values and actual output values are less than a predetermined value. It should be understood that the construction of a full color and fully calibrated CMYK-TRC is also effected by the controlled points from the previously constructed K-TRC and the controlled points of the CMY-TRC. Uncontrolled points that are in between the control points are constructed using well known linear interpolation techniques. The fully constructed CMYK-TRCs are then provided to the digital front end as accurately calibrated TRCs for that device.

As previously stated, printing equal amounts of cyan, magenta and yellow should produce, in principle, a specific neutral gray. Instead, printers generally make a chromatic gray (a*,b*≠0) rather than a neutral gray. The printer will not produce a specific neutral gray due to limitations on the color pigments of the primaries and on the processes of the print engine. To overcome this last effect, gray balanced TRCs are used as LUTs to modulate the proportions of cyan, magenta and yellow depending on the state of the materials and of the print engine. For gray balancing printers, spectrophotometers are often used as sensors because gray is a mix of cyan, magenta and yellow primaries. Sensor to sensor differences are likely to result in differences in quality among prints across a plurality of differing print machines. The following eliminates sensor to sensor variations among different machines in order to reduce overall machine-to-machine variations.

As it is useful to address non-uniformity problems in software, the present invention enables calibrating the control system used to build spatial gray balanced functions, known as Tone Reproduction Curves (TRCs) using reflectance measurements from a limited set of mixed color test patches. For example, spatial gray balanced TRCs can be generated accurately using about 20 mixed CMY gray patches and about 20 K patches. These TRCs enable coarse non-uniformity correction thereby overcoming low frequency structures. "Spatial" gray balanced TRCs are defined herein as a collection of gray balanced TRCs, which are position dependent. In other words, during processing of an image, separate positions, e.g., pixels, of the image are each run through a spatial TRC that has been especially designed for that position. TRCs for calibrating a marking system are generated from reflectance values obtained from a plurality of test patches of marking medium marked by the marking system and aligned in a first direction, the first direction being a direction of least non-uniformity; obtaining a plurality of reflectance values from at least one second test patch of marking medium aligned in a second direction that crosses the first direction, the second direction being a direction of greatest non-uniformity; obtaining a set of gray balanced TRCs based on the reflectance values of the first test patches; and obtaining a set of spatial gray balanced TRCs based on the reflectance values of the second test patches. The target test values for these test patches can be read from the printed reference hardcopy as disclosed herein.

According to the method of the present invention, a printed reference (also called a hardcopy reference) is created. Preferably, an accurate and repeatable reference sensor is used for creating the printed reference. This reference ensures that color patches on the printed page have colors close to or equal to the desired L*a*b* values. The reference sensor could be one of the inline sensor or standard commercially available spectrophotometers, e.g., X-Rite or GreTag commonly found in this field of art. Inline sensor reference values are created by placing the printed reference document in the input tray. A postscript document is printed with the patch layout designed for creating the printed reference. The created printed reference represents the best CMY neutral gray the printer can achieve under any condition, and its "neutral" character is only limited by the nature of pigment set. Creation of the printed reference should be done with the same reference sensor (inline or offline). The printed reference is then transported through the paper path of multiple printers with printing process mode disabled in each printer. By disabling the printing process thereof, no toner is developed on the printed reference.

Figure 1:
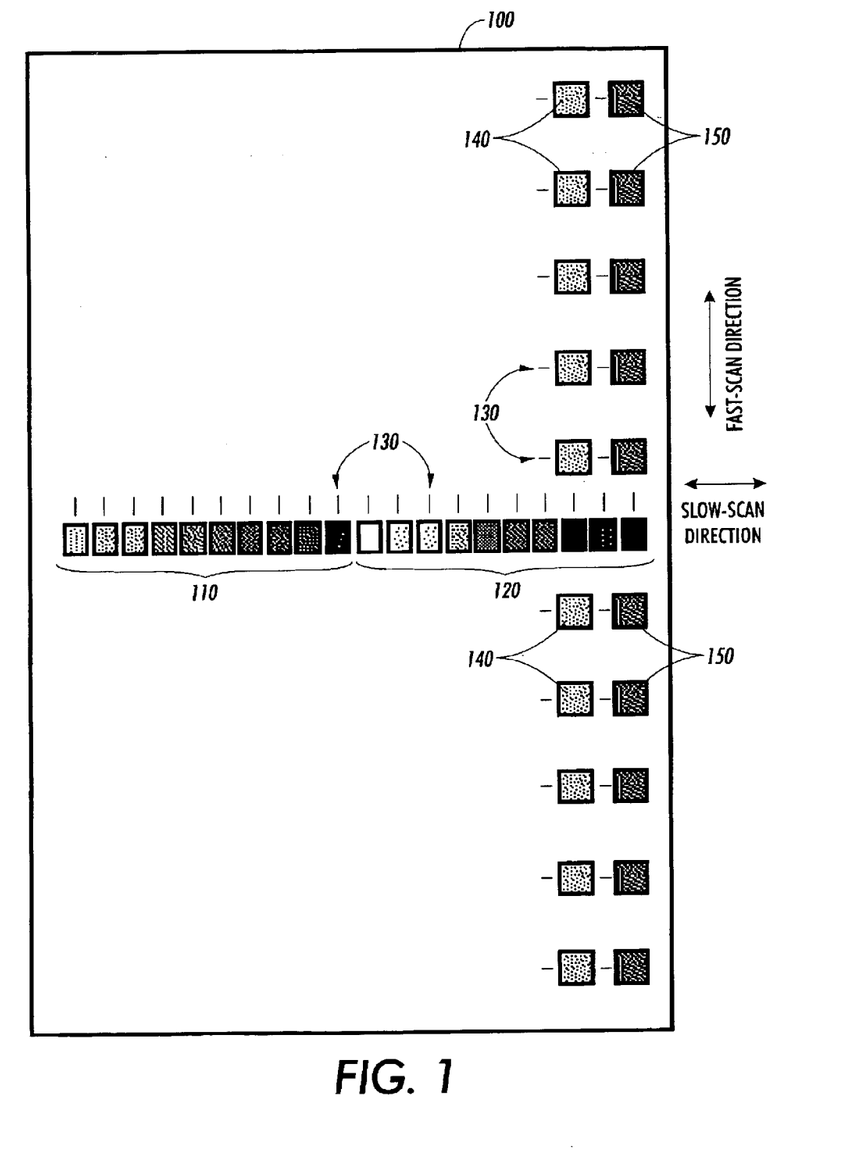
FIG. 1 is an exemplary test patch pattern used for calibrating a marking system.

Attention is now directed to FIG. 1 which illustrates an exemplary test patch pattern 100 used for calibrating a marking system that marks using Cyan (C), Magenta (M), Yellow (Y) and black (K) marking media, such as ink, toner or the like. The test pattern 100 includes a set of CMY gray patches 110, i.e., patches in which CMY marking media have been combined to make gray, and a set of K gray patches 120, i.e., patches in which black marking media has been applied at a certain area coverage to yield a "gray" patch. The CMY gray patches 110 vary from 0–100% coverage, as do the K gray patches 120. The CMY gray patches 110 and the K gray patches 120 extend in the slow-scan direction of the marking system to be calibrated, e.g., the direction of paper feed.

Fiducial mark 130, located adjacent patches 110 and 120, are detected by a sensor to trigger measuring of the reflectance of adjacent patch 110 or 120 by a reflectance sensor. The fiducial marks may not be necessary if another method is employed to trigger measurement of the reflectance of each patch at the appropriate time as the patches pass under the reflectance sensor.

Test pattern 100 includes a row of K gray patches 140 extending in the fast-scan direction, and a row of CMY gray patches 150 extending alongside the K gray patches 140. The "slow-scan direction" is the direction of paper feed in the marking system, and the "fast-scan direction" is the direction substantially perpendicular to the slow-scan direction. The row of patches 140 and the row of patches 150 should extend substantially the entire length of the fast-scan direction of marking system 200, assuming that non-uniformity is potentially a problem over the entire length. However, if non-uniformity is known to be a potential problem only over a portion of the fast-scan direction of the marking system 200, then patches 140 and 150 may extend a shorter length, such as 75% or 50% of the fast-scan direction depending on the length of potential non-uniformity.

The CMY gray patches 150 extending alongside the K gray patches 140 give spatial non-uniformity information for patches with input digital values determined in advance using reference spatial sensitivity studies. The K gray patches 140 and CMY gray patches 150 are each the same color, e.g., 50% gray or any other value between 0 and 100%, depending on what value was used for the reference studies. In this example, a total of 40 test patches are used. However, more or fewer patches may be used, as appropriate, based on the desired resolution and bandwidth requirement for page non-uniformity. Like the patches 110 and 120, each patch 140 and 150 has fiducial mark 130 adjacent thereto. Patches 140 and 150 can be positioned on the page at most-sensitive locations spread on the page. These locations can be determined through off-line studies according to known methods. Furthermore, as described in more detail below in connection with FIG. 5, the sets of patches 140 and 150 may each be replaced by a single strip of marking medium, from which a plurality of reflectance values are obtained.

Figure 2:
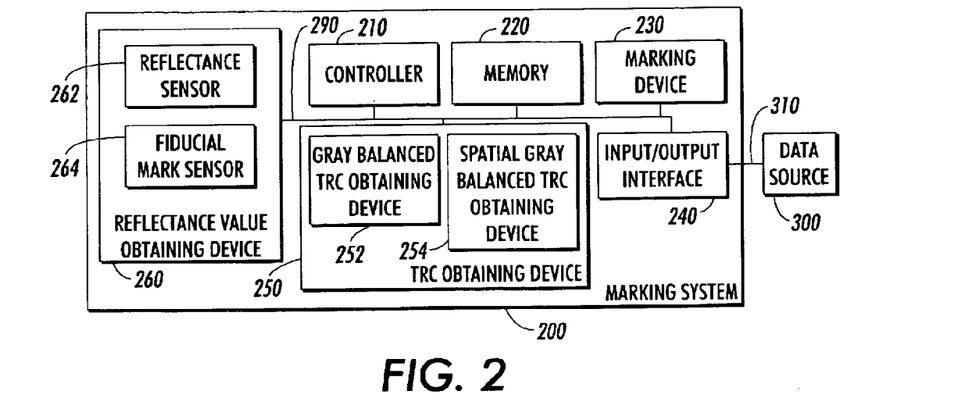
FIG. 2 is a functional block diagram illustrating an exemplary marking system.

Attention is now being directed to FIG. 2 which shows a functional block diagram illustrating exemplary marking system 200 connected to data source 300 via link 310. Data source 300 can be a digital camera, a scanner, or a locally or remotely located computer, or any other known or later developed device that is capable of generating electronic image or text data. Similarly, data source 300 can be any suitable device that stores and/or transmits electronic data, such as a client or a server of a network. Data source 300 can be connected to marking system 200 over a connection device, such as a modem, a local area network, a wide area network, an intranet, the Internet, any other distributed processing network, or any other known or later developed connection device. Data source 300 can be any known or later developed device, which is capable of supplying electronic data over link 310 to marking system 200. Link 310 can thus be any known or later developed system or device for transmitting the electronic image data from image data source 300 to marking system 200. It should be appreciated that link 310 can be a wired, wireless or optical link to a network (not shown). The network can be a local area network, a wide area network, an intranet, the Internet, or any other distributed processing and storage network.

Marking system 200 includes controller 210, memory 220, marking device 230, input/output interface 240, tone reproduction curve (TRC) obtaining device 250, and a reflectance value obtaining device 260, which are interconnected by data/control bus 290. TRC obtaining device 250 includes gray balanced TRC obtaining device 252 and spatial gray balanced TRC obtaining device 254. Reflectance value obtaining device 260 includes reflectance sensor 262 and fiducial mark sensor 264. Controller 210 controls the operation of other components of marking system 200 as necessary, performs any necessary calculations and executes any necessary programs for implementing the processes of marking system 200 and its individual components, and controls the flow of data between other components. Memory 220 serves as a buffer for information coming into or going out of marking system 200, may store any necessary programs and/or data for implementing the functions of marking system 200, and/or may store data at various stages of processing. Furthermore, it should be appreciated that memory 220, while depicted as a single entity, may actually be distributed. Alterable portions of memory 220 are implemented using static or dynamic RAM. However, memory 220 can also be implemented using a floppy disk and disk drive, a write-able optical disk and disk drive, a hard drive, flash memory or the like. The generally static portions of memory 220 are implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like. Marking device 230 may be, for example, a marking engine or marking head, such as a print engine or print head, and is capable of reproducing images or text received from data source 300 via input/output interface 240 by causing marking medium, such as ink, toner or the like, to be arranged in appropriate configurations on a substrate. TRC obtaining device 250 obtains gray balanced TRCs and spatial gray balanced TRCs in accordance with reflectance values obtained from test patches, as described in more detail below.

Reflectance value obtaining device 260 obtains reflectance values from test patches, such as test patches 110, 120, 140 and 150 shown in FIG. 1. Specifically, relative movement is effected between the test patches and reflectance sensor 262, which may, for example, be an on-line or off-line spectrophotometer, so that reflectance sensor 262 can obtain a reflectance value from each patch. An on-line spectrophotometer may be a special purpose spectrophotometer built into the marking device, or may be implemented using an LED array as described, for example, in co-pending U.S. application Ser. No. 09/941,774, entitled" "SYSTEMS AND METHODS FOR DETERMINING SPECTRA USING DYNAMIC KARHUNEN-LOEVE ALGORITHMS WITH MEASUREMENTS FROM LED COLOR SENSOR", or co-pending U.S. application Ser. No. 09/941,858, entitled: "SYSTEMS AND METHODS FOR DETERMINING SPECTRA USING DYNAMIC LEAST SQUARES ALGORITHMS WITH MEASUREMENTS FROM LED COLOR SENSOR." In the case of an off-line spectrophotometer, which may, for example, be one of various spectrophotometers sold by Gretag MacBeth, ExColor, and X-Rite, it will be appreciated that reflectance value obtaining device 260 will not be physically integrated into marking device 200 as shown in FIG. 1, but rather will be arranged separately with a separate connection or other device for transferring reflectance measurements to controller 210, TRC obtaining device 250 and/or memory 230.

Fiducial marks 130 are detected by fiducial mark sensor 264 to trigger measuring of the reflectance of adjacent patch 110, 120, 140 or 150 by reflectance sensor 262. Depending on the physical arrangement of reflectance sensor 262 and/or fiducial mark sensor 264, test pattern 100 may need to be rotated 90 degrees manually or automatically in order to have the patches 110, 120, 140 or 150 scanned. For example, if reflectance sensor 262 is mounted so as to be stationary relative to the overall marking system and the patches are detected by moving the test pattern past the reflectance sensor in the slow scan direction, then the patches 140 and 150 can not be detected unless the test pattern is rotated 90 degrees from its orientation during marking of the test pattern. However, with some arrangements, particularly with off-line spectrophotometer arrangements, the reflectance sensor and test pattern 100 may be relatively movable in two crossing directions, thereby making it unnecessary to rotate the test pattern.

Spatial gray balanced TRCs are obtained in two general steps: (1) gray balanced TRC obtaining device 252 obtains gray balanced TRCs based on the reflectance values of the test patches 110 and 120, and (2) spatial gray balanced TRC obtaining device 254 scales the gray balanced TRCs based on reflectance values of the test patches 140 and 150 to obtain spatial gray balanced TRCs. These spatial gray balanced TRCs may then be used to calibrate the marking device. The steps performed by the gray balanced TRC obtaining device and the spatial gray balanced TRC obtaining device are not necessarily sequential. Portions of the steps may be performed concurrently, and/or the steps may interact such that one or more portions of one step use information obtained from one or more portions of the other step.

The spatial gray balanced TRCs are obtained as follows. First, test pattern 100 is marked on a substrate by the marking system after being run through a TRC in the image path to determine the appropriate CMY or K values for the next iteration. The reflectance spectra of each patch 110, 120, 140 and 150 is measured using the reflectance sensor. The reflectance spectra are converted to a color space such as L*a*b*. These calculated L*a*b* values are compared to desired L*a*b* values, which have been empirically determined in advance. If the differences are higher than a predetermined threshold, an iterative process, which may include marking of a revised test pattern on a substrate, obtaining measured values of test patches of the revised test pattern, and comparing the new measured values with the desired values, is performed to converge the calculated L*a*b* values toward the desired L*a*b*values. The iterative process is repeated as necessary until the calculated L*a*b* values have been converged to within the predetermined threshold.

These are then compared to desired (nominal) L*a*b* values for each of the patches in the reference image. An iterative algorithm is preferred for single color controls which allows a spatial color profile, e.g., a spatial gray balanced tone reproduction curve, to be obtained efficiently using a set of reflectance values obtained from at least one mixed color patch.

A gain matrix designed using (1) the reflectance measurements for all of the patches 110, 120, 140 and 150 at their input digital values and (2) known single and/or multivariate feedback control principles may be used for the iterative process with respect to all of the patches 110, 120, 140 and 150. After the iterative process has been completed, TRCs are generated based on the resulting calculated CMY and K values obtained for the test patches. These are the gray balanced TRCs, and are one-dimensional TRCs.

Figure 3:
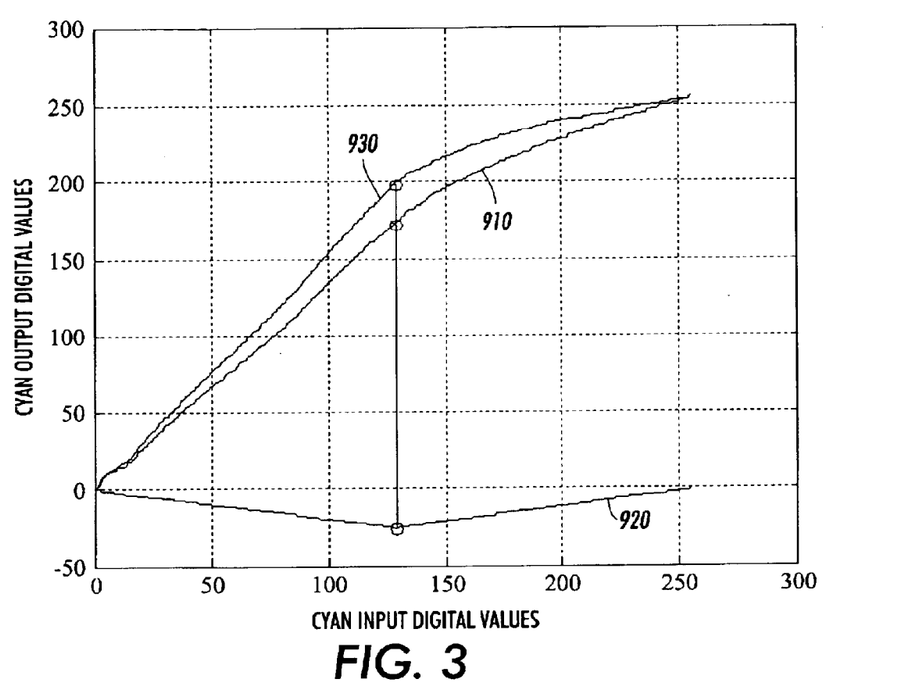
FIG. 3 is a diagram showing an exemplary gray balanced TRC, spatial gray balanced TRC and non-uniformity profile function obtained.

The K values obtained for the patches and the CMY values obtained for the patches 150, which may have been revised, along with the CMY and K values for the patches 110 and 120 during the above-described iterative process, are used to create non-uniformity profile functions, which are in turn used, in combination with the one-dimensional, gray balanced TRCs obtained from the patches, to generate spatial gray balanced TRCs. An example is shown in FIG. 3, which is a diagram showing an exemplary cyan TRC 910 obtained using CMY patches 110. A non-uniformity profile function 920 obtained using patches 150 is operated with the TRC to obtain a spatial gray balanced TRC 930.

A simple equation for the non-uniformity profile function can be of a linear nature as: $Nf=[(Dspatial\_iter-Dgray\_iter) \times Dinput]/Dspatial\_input$; for $Dinput=0$ to $Dspatial\_input+1$; and $Nf=[(Dspatial\_iter-Dgray\_iter) \times (255-Dinput)]/[255-Dspatial\_input+1]$; for $Dinput=Dspatial\_input+2$ to 255; where, $Nf$ is the non-uniformity at the test patch location; $Dspatial\_iter$ are the converged digital CMY or K values of the spatial patches (patches 140 and 150); $Dgray\_iter$ are the converged CMY or K values of the gray balance patches (patches 110 and 120); $Dinput$ are the digital input values from 0 to 255 in steps of 1 for an 8-bit system; and $Dspatial\_input$ are the CMYK input values of the spatial patches (patches 140 and 150). It should be appreciated that the spatial non-uniformity function can also be non-linear and its shape can be predetermined through offline experiments. The input values for the spatial patches are selected at the region where the slope of this function is zero—which is the highest sensitivity point.

Once the non-uniformity function at the spatial patch location is obtained from the above equation using the converged CMY or K values of the spatial patches, the spatial TRCs are calculated using the following: Spatial gray balanced TRC at the spatial patch location=gray balanced TRC+non-uniformity profile function at the spatial patch location. After spatial gray balanced TRCs are obtained for each of the patch locations for the patches, it is possible to increase the density of the spatial gray balanced TRCs along the fast-scan direction by well known interpolation and smoothing techniques. Ultimately, one spatial gray balanced TRC may be generated for every pixel of—a page, e.g., a substrate to be marked by the marking system 200.

In the above, it is assumed that, during the iterative process, CYM and K values are iteratively revised and a revised test pattern is created and marked on a test substrate during each iteration. In this case, the TRC in the image path, which is a spatial TRC and may be an identity TRC or any other predetermined TRC, remains unchanged until it is replaced by the spatial gray balanced TRC obtained as a result of the processing. As a modification of the above-described procedure, rather than modifying the test pattern file itself, the spatial TRC may be updated during each iteration. In this case, the updated spatial TRC that remains after the iterative process has been completed is the final TRC that is stored and retained.

It should be understood that each of the circuits, shown in FIG. 1, can be implemented as portions of a suitably programmed general purpose computer. Alternatively, each of the circuits can be implemented as physically distinct hardware circuits within an ASIC, or using a FPGA, a PDL, a PLA or a PAL, or using discrete logic elements or discrete circuit elements. The particular form each of the circuits will take is a design choice and will be obvious and predictable to those skilled in the art.

Figure 4:
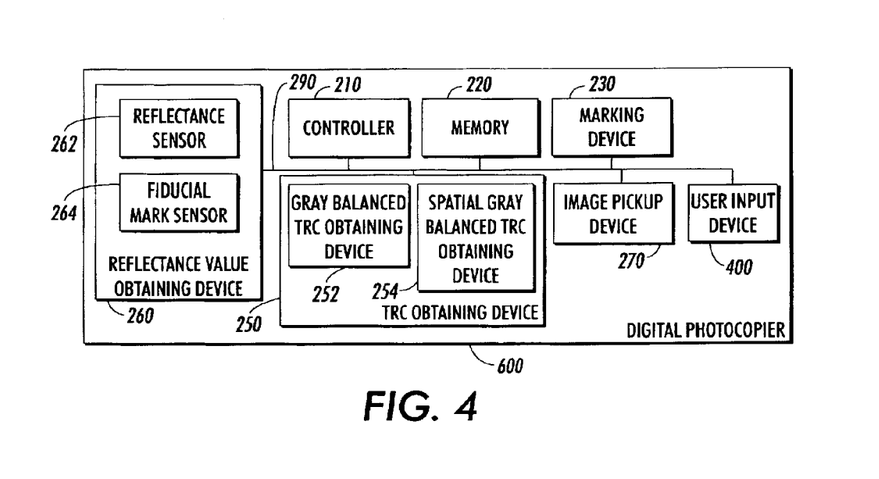
FIG. 4 is a functional block diagram illustrating an exemplary digital photocopier.

Attention is now being directed to FIG. 4 which shows a functional block diagram illustrating exemplary digital photocopier 600 similar to marking system 200 in FIG. 1, except that the digital photocopier may be self-contained because it includes image pickup device 270, such as a scanner, and user input device 400, and therefore is not reliant on an external data source (although an external data source may also be connected, if desired).

Figure 5:
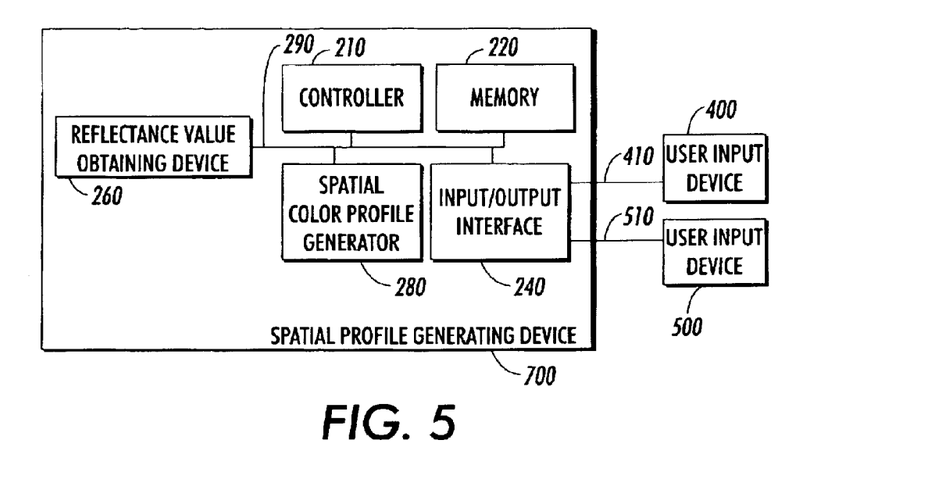
FIG. 5 is a functional block diagram illustrating an exemplary spatial profile generating device.

Attention is now being directed to FIG. 5 which shows a functional block diagram illustrating exemplary spatial profile generating device 700. Spatial tone reproduction curves can be considered as spatial profiles of a test pattern. However, the spatial profile generating device is not limited to application to a marking engine, and may be used to generate a spatial color profile of any surface. The spatial profile generating device includes a reflectance value obtaining device 260 and spatial color profile generator 280, and is connected to data sink 500 and user input device 400 via links 510 and 410, respectively. Links 510 and 410, like link 310 of FIG. 1, may be any suitable wired, wireless or optical links. Data sink 500 can be any device that is capable of outputting or storing processed data generated by the spatial profile generating device, such as a printer, a copier or other image forming devices, a facsimile device, a display device, a memory, or the like.

Figure 6:
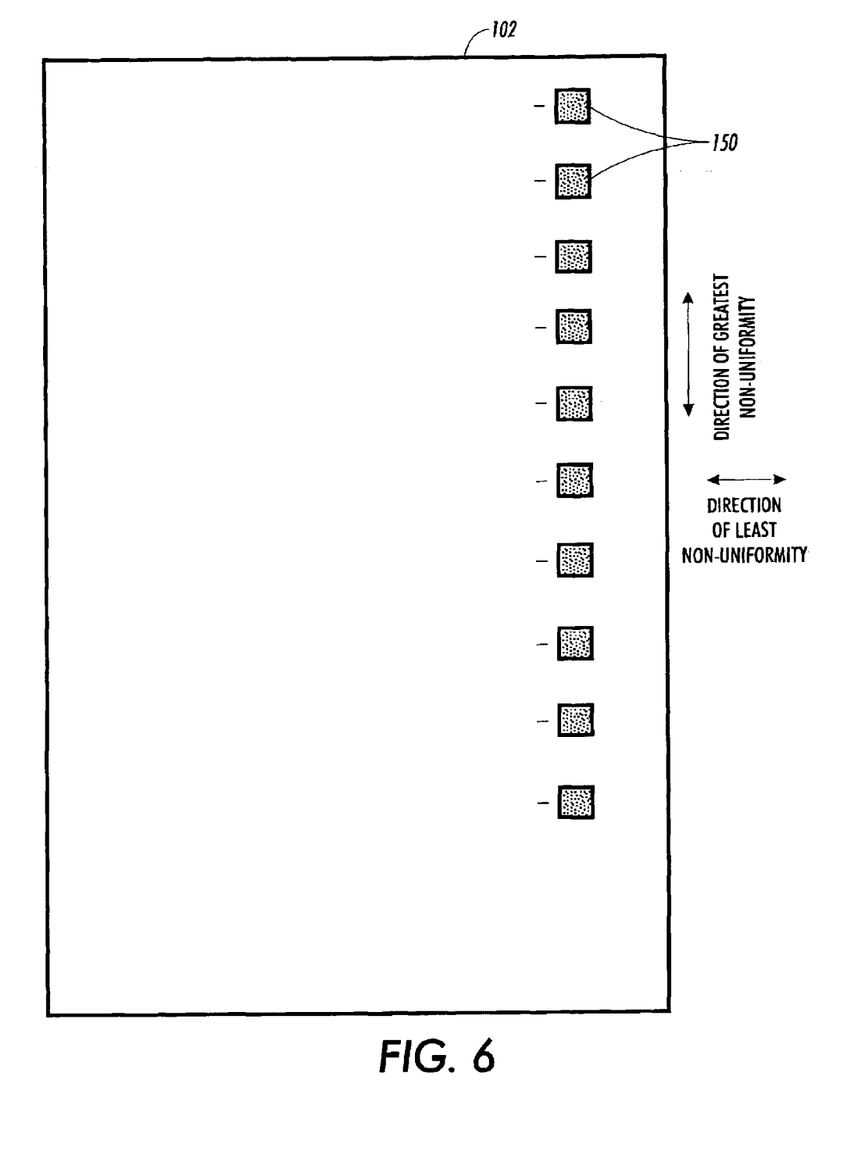
FIG. 6 illustrates an exemplary test patch pattern for obtaining a spatial color profile.

Attention is now being directed to FIG. 6 which illustrates exemplary test patch pattern 102 used for obtaining a spatial color profile using the spatial profile generating device of FIG. 5. Assuming there is spatial non-uniformity across the surface to be profiled, relative movement between the reflectance value obtaining device should be effected in the direction of greatest non-uniformity. Patches 150 represent actual color patches of an actual surface. It should be appreciated that the patches may not actually be visibly separate patches, but may instead merely represent individual positions on a continuously colored surface. Examples of uses for the spatial profile generating device, other than for calibrating a marking system, might include coil coating applications, painting, etc.

Figure 7:
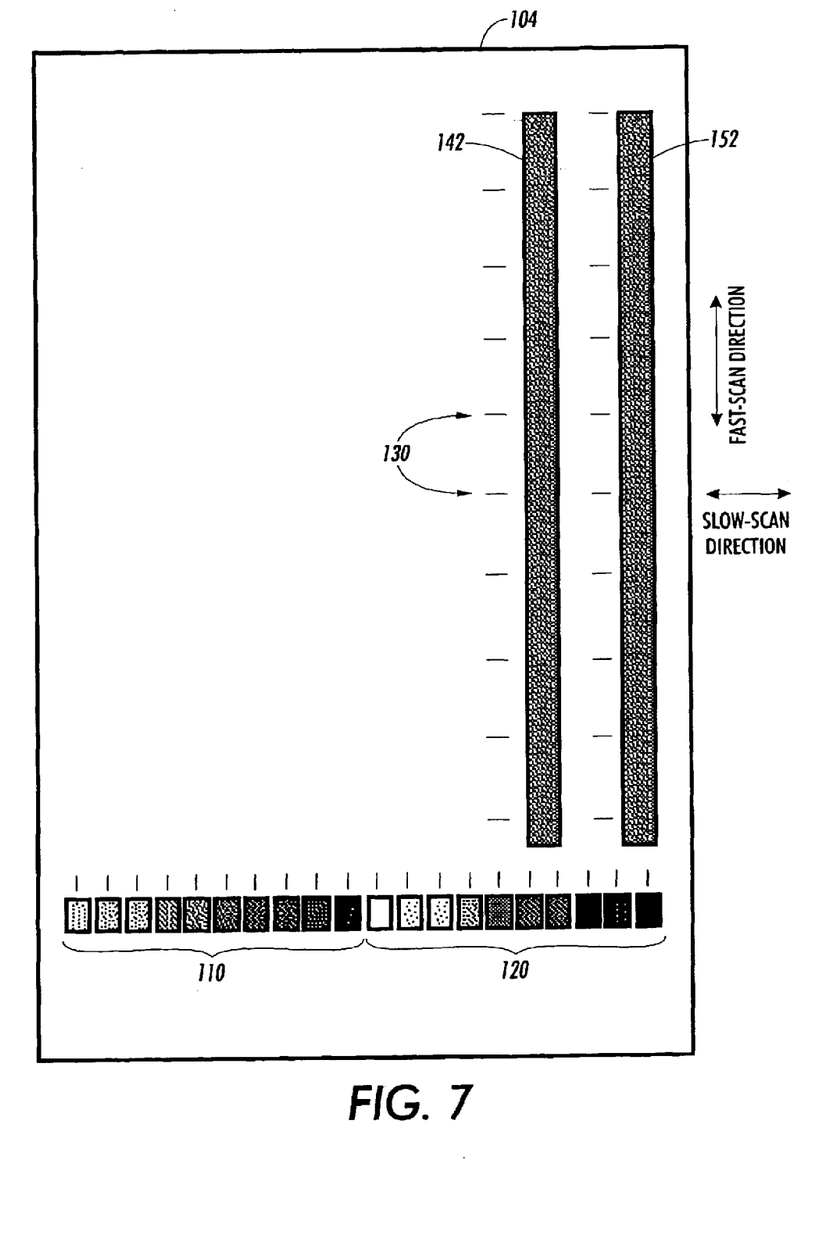
FIG. 7 illustrates an exemplary test patch pattern for calibrating a marking system.

Attention is now being directed to FIG. 7, which illustrates another test patch pattern 104 used for calibrating the marking system 200. From this example, it can be seen that single elongated patches 142 and 152 may be used in place of the plurality of patches 140 and the plurality of patches 150. In this case, a plurality of reflectance measurements are taken along each patch 142 and 152, triggered by the fiducial marks 130. It should be appreciated that the fiducial marks are not necessary if some other method of triggering the reflectance sensor is used.

It should also be appreciated that the patches 110 and 120 need not be near the middle of the page, as shown in FIG. 1, or near the bottom of the page, as shown in FIG. 6, but may be at any other location on the page as desired or convenient. Those skilled in the art will also appreciate various other possible modifications of the test pattern. For example, rather than providing patches 140 and 150 or 142 and 152 as shown in FIGS. 1 and 7, a plurality of sets of the patches 110 and 120 may be provided. For example, considering the patches 110 and 120 of FIG. 1 as a single "row," a plurality of such "rows" could be printed, such that patches of each "row" would align with corresponding patches of the other "rows." Corresponding patches of the rows would thus form "columns" extending in the fast-scan direction. Selected ones of these "columns" could then be used in the same manner as the patches 140 and 150 or 142 and 152 of FIGS. 1 and 7.

Other conceivable variations on the test patterns of FIGS. 1 and 7 are that the CMY patches and K patches could be mixed, and/or that the number of K patches could differ from the number of CMY patches. For example, the patches 110 shown in FIG. 1 could be replaced by seven K patches varying from 0–100% coverage and three CMY patches at 100% coverage, and the patches 120 could be replaced by CMY patches that vary from 0 to a number slightly less than 100% coverage.

Figure 8:
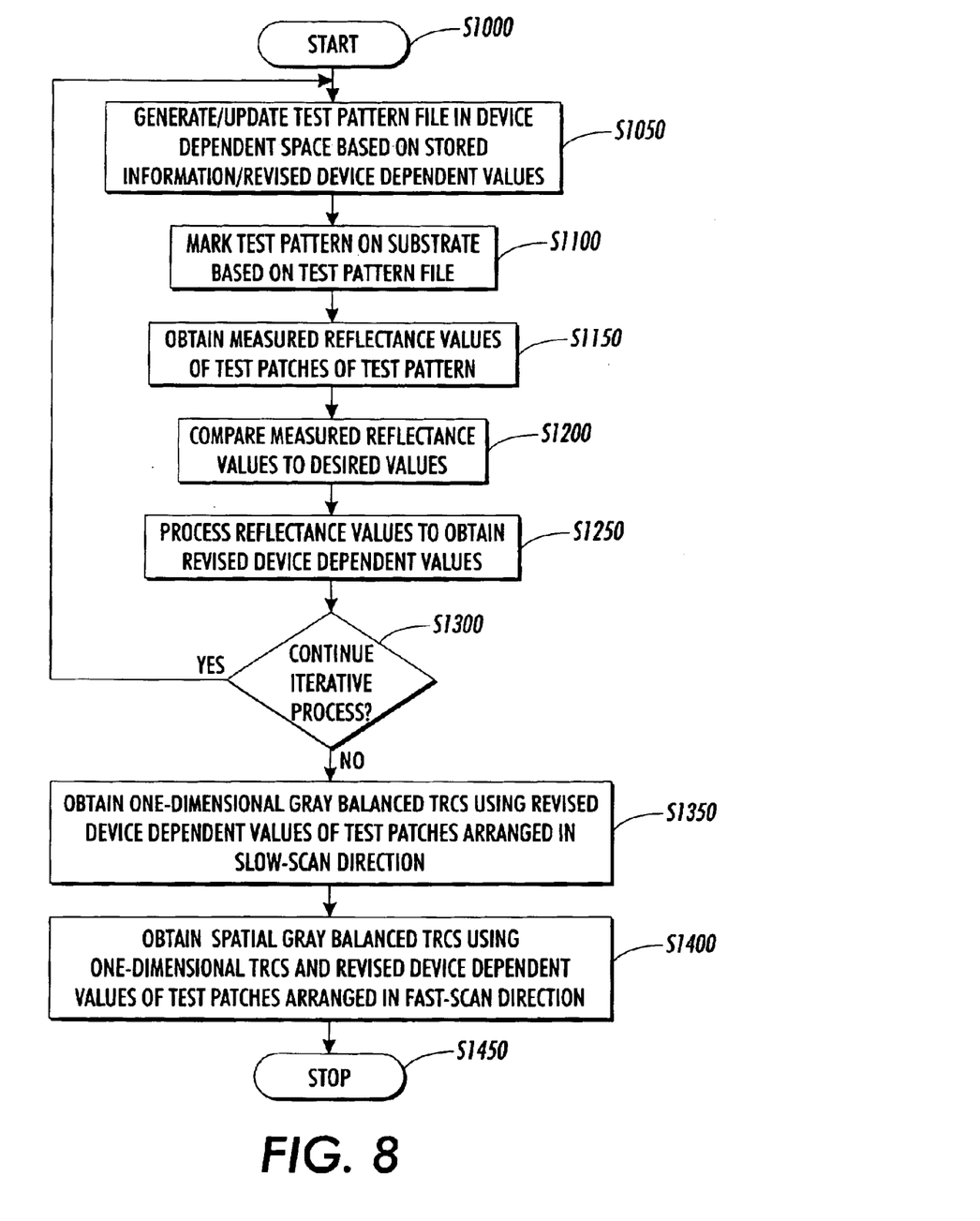
FIG. 8 is a flowchart illustrating an exemplary method of obtaining spatial gray balanced tone reproduction curves.

Attention is now being directed to FIG. 8 which shows a flowchart illustrating an exemplary method of obtaining spatial gray balanced tone reproduction curves. Beginning in step S1000, the process continues to step S1050 and generates a test pattern file in device dependent space, such as CMYK space. This is done based on pre-stored and/or user-input information. The test pattern is marked on a substrate in step S1100. The process then continues to step S1150 wherein measured reflectance values of test patches of the test pattern are obtained using, for example, a spectrophotometer or the like. Continuing to step S1200, the measured reflectance values are compared to desired values, and in step S1250, the measured reflectance values are processed to obtain revised device dependent values, e.g., revised CYMK values. The process then continues to step S1300 and determines whether to continue an iterative process. This determination may be made based on, for example, whether the difference between the measured values and desired values compared in step S1200 is within a predetermined threshold. If it is determined to continue the iterative process, the process returns to step S1050 and updates the test pattern file, and steps S1050–S1300 are repeated. Otherwise, the process continues to step S1350 wherein one-dimensional gray balanced TRCs are obtained using the measured reflectance values, from the most recent iteration of step S1150, of test patches in the test pattern that are arranged in a slow-scan direction. The process continues to step S1400 and obtains spatial gray balanced TRCs by using the one-dimensional gray balanced TRCs and the measured reflectance values, from the most recent iteration of step S1150, of test patches in the test pattern that are arranged in a fast-scan direction. These spatial gray balanced TRCs are saved to be used, for example, for calibrating a marking system, and the process stops at step S1450.

Figure 9:
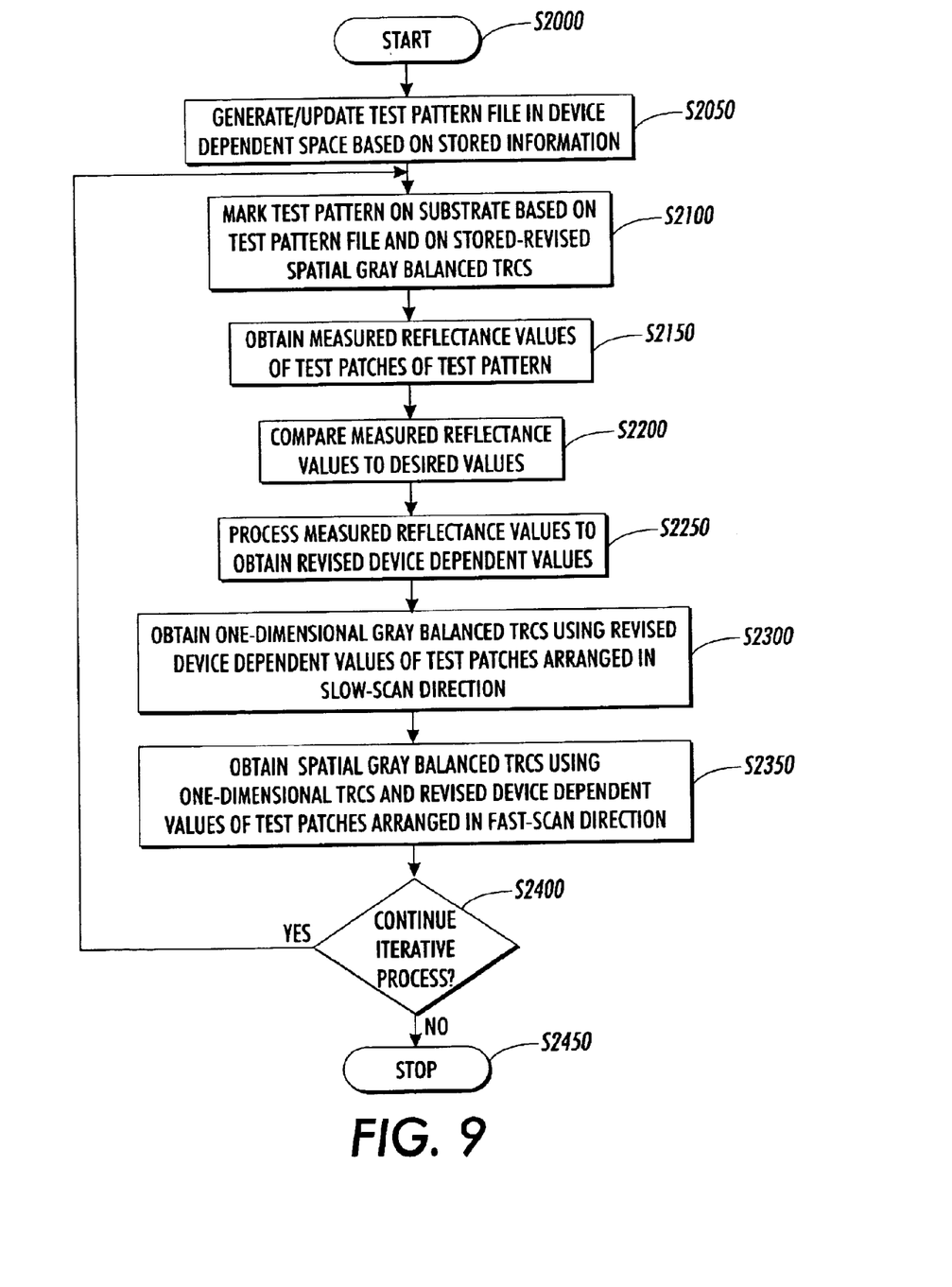
FIG. 9 is a flowchart illustrating another exemplary method of obtaining spatial gray balanced tone reproduction curves.

With reference now being made to FIG. 9, a flowchart illustrates yet another exemplary method of obtaining a spatial color profile. Beginning in step S2000, the process continues to step S2050 and generates a test pattern file in device dependent space, such as CMYK space. This is done based on pre-stored and/or user-input information. The test pattern is marked on a substrate in step S2100, based on the test pattern file and on a stored spatial gray balance TRC. The process then continues to step S2150 wherein measured reflectance values of test patches of the test pattern are obtained using, for example, a spectrophotometer or the like. Continuing to step S2200, the measured reflectance values are compared to desired values, and in step S2250, the measured reflectance values are processed to obtain revised device dependent values, e.g., revised CYMK values. Next, in step S2300, one-dimensional gray balanced TRCs are obtained using the measured reflectance values, from the most recent iteration of step S2150, of test patches in the test pattern that are arranged in a slow-scan direction. The process continues to step S2350 and obtains spatial gray balanced TRCs by using the one-dimensional gray balanced TRCs and the measured reflectance values, from the most recent iteration of step S2150, of test patches in the test pattern that are arranged in a fast-scan direction. The process then continues to step S2400 and determines whether to continue an iterative process. This determination may be made based on, for example, whether the difference between the measured reflectance values and desired values compared in step S2200 is within a predetermined threshold. If it is determined to continue the iterative process, the process returns to step S2100 and revises the spatial gray balanced TRC, a new test pattern is marked based on the revised spatial gray balanced TRC the test pattern file, and steps S2100–S2350 are repeated. Otherwise, the process retains the most recent spatial gray balanced TRC for, for example, subsequent calibration of a marking system, and continues to step S2450 and stops.

Figure 10:
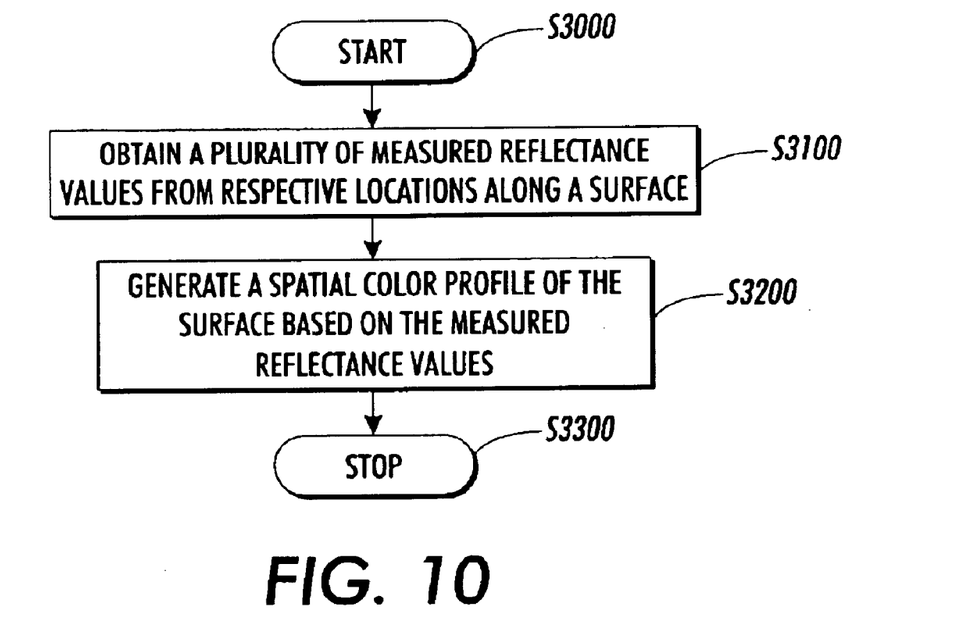
FIG. 10 is a flowchart illustrating an exemplary method of obtaining a spatial color profile.

Reference is now being made to FIG. 10 which shows a flowchart illustrating an exemplary method of obtaining a spatial color profile. Beginning in step S3000, the process continues to step S3100 and obtains a plurality of measured reflectance values from respective locations spaced along a surface, preferably in a direction of known or suspected non-uniformity. Next, in step S3200, a spatial color profile of the surface is generated based on the measured reflectance values. The process then continues to step S3300 and stops.

The marking system of FIG. 2 and the spatial profile generating device of FIG. 5 may be implemented on a single program general purpose computer or separate programmed general purpose computer, with an associated reflectance value obtaining device 260 (and marking device 230, in the case of FIG. 2). The marking system and spatial profile generating device can also be implemented on a special purpose computer, a programmed micro-processor or microcontroller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the implement the marking system and/or spatial profile generating device according to this invention.

The L*a*b* values of the patches are measured using the reference sensor. These values are used as reference values for the gray balance system. Instead of the low cost inline sensor, an offline sensor is used for controlling colors except that the printed reference is kept directly underneath the offline sensor. The printer should have an input path for moving the printed reference throughout the paper path with printing process mode is disabled (development, fusing, etc.) While constructing the gray balanced TRC, use the desired (nominal) L*a*b* values with a*, b*=0, instead of the target L*a*b* values created for each printer.

The disclosed methods may be readily implemented in software using object or object-oriented software development environments that provide portable source code that can be used on a variety of computer or workstation hardware platforms. Alternatively, appropriate portions of the disclosed marking system and the spatial profile generating device may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The processing systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer or as a resource residing on a server or workstation, such as a routine embedded in a photocopier, a color photocopier, a printer driver, a scanner, or the like.

The systems and methods can also be implemented by physical incorporation into a software and/or hardware system, such as the hardware and software system of a photocopier or a dedicated image processing system.

What is claimed is:

1. A method for calibrating a marking system of at least one or more printers to maintain color consistency with a reference printers comprising:
    (a) obtaining a printed reference on the reference printer, the printed reference having at least one test patch;
    (b) obtaining at least one reflectance value from said test patch in the printed reference by obtaining reflectance values from one or more first test patches each aligned in a first direction and obtaining reflectance values from one or more second test patches each aligned in a second direction that crosses the first direction, the second test patches having at least one patch of CMY gray extending in the second direction;
    (c) creating sensor reference values for each printer of the marking system by placing the printed reference in the input tray of each printer of the marking system transporting the printed reference through the paper path of each printer of the marking system and obtaining at least one reflectance value from the printed reference using the sensors of each printer of the marking system; and
    (d) calibrating the control system of each printer of the marking system using the obtained reflectance values.

2. A method for calibrating a marking system to maintain color consistency, as in claim 1, further comprising first disabling each printer's process mode such that no toner or oil is developed on the printed reference.

3. A method for calibrating a marking system to maintain color consistency, as in claim 1, where the obtained reflectance values are first converted into color values to be used as reference values.

4. A method for calibrating a marking system to maintain color consistency, as in claim 1, wherein the control system of each printer is a gray-balanced control system.

5. A method for calibrating a marking system to maintain color consistency, as in claim 1, wherein the first direction is a direction of least non-uniformity and the second direction is a direction of greatest non-uniformity.

6. A method for calibrating a marking system to maintain the color consistency thereof, as in claim 1, wherein at least one of the second test patches having at least one patch of K gray extending parallel to the at least one patch of CMY gray.

7. A method for calibrating a marking system to maintain color consistency, as in claim 1, wherein at least one of the second test patches extending the length of the marking path of that printer.

8. A method for calibrating a marking system to maintain color consistency, as in claim 1, further obtaining a set of spatial gray balanced tone reproduction curves based on the reflectance values of the first test patches and the reflectance values of the second test patches.

9. A method for calibrating a marking system to maintain color consistency, as in claim 8, wherein the set of spatial gray balanced tone reproduction curves incorporates a non-uniformity profile.

10. A method for calibrating a marking system to maintain color consistency, as in claim 9, wherein the non-uniformity profile is partially based on the reflectance values of the second test patches.

11. A method for calibrating a marking system to maintain color consistency, as in claim 9, wherein the non-uniformity profile is at least partially based on the gray balanced tone reproduction curves.

12. A method for calibrating a marking system to maintain color consistency, as in claim 8, wherein the set of spatial gray balanced tone reproduction curves comprises a pixel-wise spatial gray balanced tone reproduction curve.

13. A method for calibrating a marking system to maintain color consistency, as in claim 1, wherein the plurality of reflectance values comprises an iterative process which converges reflectance values toward at least one desired value.

14. A method for calibrating a marking system to maintain color consistency, as in claim 13, wherein each iteration uses revised successive test patterns.

15. A method for calibrating a marking system to maintain color consistency, as in claim 14, wherein each successive pattern includes a revised version of said test patches.

16. A method for calibrating a marking system to maintain color consistency, as in claim 15, wherein each successive test pattern is marked based on a test pattern file that has been updated.

17. A method for calibrating a marking system to maintain color consistency, as in claim 16, wherein the updating is based on information obtained by comparing the reflectance values with the desired values.

18. A method for calibrating a marking system to maintain color consistency, as in claim 16, wherein each successive test pattern is marked based on a revised spatial gray balanced tone reproduction curve.

19. A method for calibrating a marking system to maintain color consistency, as in claim 18, wherein each successive test pattern has been revised based on information obtained by comparing reflectance values with desired values.

* * * * *